UNITED STATES PATENT OFFICE.

ERNST ULRICHS, OF ALTER MARKT, ELBERFELD, GERMANY, ASSIGNOR TO COMPANY "WÜLFING, DAHL & CO., ACTIENGESELLSCHAFT FARBENFABRIKEN," OF BARMEN, GERMANY.

AZO DYE.

937,741.   Specification of Letters Patent.   Patented Oct. 19, 1909.

No Drawing.   Application filed March 9, 1909.   Serial No. 482,241.

*To all whom it may concern:*

Be it known that I, ERNST ULRICHS, a subject of the King of Prussia, German Emperor, and resident of Alter Markt, Elberfeld, Province of the Rhine, German Empire, have invented certain new and useful Improvements in Azo Dyes, of which the following is a specification.

This invention relates to a method of producing an azo-dye which shall be specially suited for use in the color lake industry. I have discovered that if the dye produced from diazo-naphthylamin-sulfo acid 2.1 and beta-naphthol is treated with a suitable condensing medium there results an azo-dye which has certain special advantages in the production of color lakes.

The following are some examples of the present invention:

Example 1: 80 kg. of the dried sodium salt (at a temperature of 100° C.) of the dye produced from diazotized naphthylamin-sulfo acid 2.1 and beta-naphthol are mixed with 400 kg. acetic anhydrid. The mixture, which is of a thin liquid constituency, is then heated and thereby thickens. When the acetic anhydrid is distilled off the remaining dye weighs 78.2 kg. The explanation of this reduction of weight over the 80 kg. originally inserted is probably that two molecules of the dye have united, so that one molecule of water has been separated out from the hydroxyl groups in the two beta-naphthol groups. A series of tests of the quantity of carbon and hydrogen present in the resulting substance seem to substantiate this view. In the new dye, which for brevity shall be called F-anhydrid, there has been found on an average an increase in the content of carbon of 1.31% (which according to the above theory should be 1.37%) and a decrease in the content of hydrogen amounting to 0.28% (by theory .18%) over the original dye before the treatment described.

F-anhydrid is distinguished by the following features:—1. It is dark red while the original substance is bright red. 2. The specific gravity of the new material is considerably lower than that of the original substance. 3. The new dye yields on treatment with Turkey red oil and boiling with a calcium salt a color-lake similar to that described in U. S. Patent No. 911186. 4. When boils which water F-anhydrid again changes into enazo-naphthylamin-sulfo acid 2.1 and beta-naphthol.

Example 2: 50 kg. of the sodium salt of the dye produced from diazo-naphthylamin-sulfo acid 2.1 and beta-naphthol are dissolved at ordinary temperatures while stirring in 400 kg. of sulfuric acid of 60° Bé. This solution is then slowly poured, while stirring, into a mixture of 940 kg. of a sodium lye of 40° Bé. and 600 liters of a saturated solution of salt in water. The resulting dye-stuff is separated off by filtration and may be further treated while in the form of a dough or it may be dried.

I claim:—

1. The process of producing an azo-dye consisting in treating the dye produced from diazo-naphthylamin-sulfo acid 2.1 and beta-naphthol with a suitable condensing medium to separate water.

2. The process of producing an azo-dye consisting in treating the dye produced from diazo-naphthylamin-sulfo acid and beta-naphthol with acetic anhydrid to separate water.

3. The dye derived from diazo-naphthylamin-sulfo acid 2.1 and beta-naphthol under separation of water and characterized by having a dark red color and less specific gravity than the dyes of the same derivatives formerly known.

Signed at Barmen, Germany, this 19th day of February 1909.

ERNST ULRICHS. [L. S.]

Witnesses:
 OTTO KÖNIG,
 KARL BAUER.